United States Patent
McDearmon

(10) Patent No.: US 6,964,521 B2
(45) Date of Patent: Nov. 15, 2005

(54) COMPLIANT LINEAR BEARING

(75) Inventor: Robert J. McDearmon, Corona, CA (US)

(73) Assignee: Honeywell International Inc., Morristown, NJ (US)

( * ) Notice: Subject to any disclaimer, the term of this patent is extended or adjusted under 35 U.S.C. 154(b) by 131 days.

(21) Appl. No.: 10/622,864

(22) Filed: Jul. 18, 2003

(65) Prior Publication Data

US 2005/0013519 A1 Jan. 20, 2005

(51) Int. Cl.[7] .......................... F16C 29/02; F16C 17/03
(52) U.S. Cl. .......................... 384/37; 384/10; 384/302
(58) Field of Search .......................... 384/7, 10, 16, 384/26, 29–32, 37, 38, 42, 302, 309, 312

(56) References Cited

U.S. PATENT DOCUMENTS

| | | | |
|---|---|---|---|
| 3,362,765 A | | 5/1963 | Pierce |
| 3,330,605 A | * | 7/1967 | Jasmand .................... 384/16 |
| 3,601,459 A | * | 8/1971 | Cutting .................... 384/100 |
| 3,972,572 A | * | 8/1976 | Hohn .................... 384/312 |
| 3,980,352 A | * | 9/1976 | Carlson .................... 384/302 |
| 4,280,741 A | * | 7/1981 | Stoll .................... 384/16 |
| 4,799,653 A | | 1/1989 | Kramer |
| 4,906,109 A | * | 3/1990 | Balsells .................... 384/26 |
| 5,131,615 A | * | 7/1992 | Hosan et al. .................... 384/32 |
| 5,437,439 A | | 8/1995 | Brokamp et al. |
| 5,664,888 A | * | 9/1997 | Sabin .................... 384/10 |
| 5,868,500 A | * | 2/1999 | Bates .................... 384/37 |
| 6,113,275 A | | 9/2000 | Blasé |
| 6,241,225 B1 | | 6/2001 | Krause |
| 6,533,459 B2 | | 3/2003 | Podhajecki et al. |
| 2003/0012467 A1 | | 1/2003 | Merot et al. |
| 2003/0035913 A1 | | 2/2003 | Shobert |

* cited by examiner

*Primary Examiner*—Thomas R. Hannon
(74) *Attorney, Agent, or Firm*—Oral Caglar, Esq.

(57) ABSTRACT

A bearing outer shell encases a self-lubricating polymeric bearing pad material concentrically therein. A helical spring applies a force through from the outer shell, through the bearing pad material, and onto a shaft when the bearing is installed on a shaft. An elastomeric base material may be interposed between the outer shell and the bearing pad to provide additional resiliency. The shaft may be sized to create an interference fit, causing a radial preload that can be designed to exceed the expected external vibration or shock forces. Proper selection of the elastomeric base material affords damping of these environments. The bearing provides the necessary guidance with minimal loss in power consumption. Therefore, not only is the useful life of the shaft and housing extended, but the life of the associated gears, bearings, and components that require proper alignment to minimize wear the load concentrations is further extended.

30 Claims, 2 Drawing Sheets

COMPLIANT LINEAR BEARING

BACKGROUND OF THE INVENTION

The present invention generally relates to a linear bearing for support of a sliding shaft or the like and, more specifically, to a compliant linear bearing having elastomeric and thermoplastic compounds and a helically wound wave spring to achieve the desired physical and functional properties.

Most linear actuators require guidance and support of an output shaft or tube assembly as the free end moves a load from a fully retracted to a fully extended position. Conventional linear bearings and guides are either expensive, using precision roller or ball bearing supports, or are very inexpensive sleeve type bearings that are either slightly oversize to effect a clearance fit and dimensional variation, or are split to accommodate size variations in the mounting base.

U.S. Pat. No. 4,799,653 discloses a shock and vibration control mechanism for radial attenuation of shock and vibration between two concentric rings, tubes or sleeves separated by a radial corrugated sheet. The patent is silent to issues surrounding axial or linear motion, and only addresses radial motion between concentric rings, tubes or sleeves.

U.S. Pat. No. 6,113,275 discloses a bearing having a bearing body 1, made of low-slip plastic, and a slit 2, extending along its entire axial length. The sliding zone of the bearing body 1 is split into several webs 3, extending in the axial direction of the bearing body 1, whose inner radial surfaces 4 create the sliding surface that comes into contact with the shaft. The webs 3 are connected to each other by means of flexible film bridges 6, so that the slit 2 can be opened or closed under deformation of the film bridges 6. This allows the bearing body 1 to be mounted on, and removed from, the shaft in a radial direction. The bearing of this patent relies on the use of a separate external housing to support the bearing body, adding cost and complexity to the bearing design.

As can be seen, there is a need for an improved linear bearing having, in a single device, long life, low cost, and minimal maintenance concerns. Such an improved linear bearing should provide the necessary guidance with minimal loss in power consumption. The improved linear bearing should not only extend the useful life of the shaft and bearing housing, but also the life of components that require proper alignment to minimize wear and load concentrations, such as associated gears and bearings.

SUMMARY OF THE INVENTION

In one aspect of the present invention, a bearing comprises an outer shell, a bearing pad concentrically disposed within the outer shell, and a helical spring between the outer shell and the bearing pad. The helical spring provides a resilient force through the bearing pad onto a shaft after the shaft is installed in the bearing. The combination of interference fit between the shaft and the bearing pads and the radial spring rate effects a radial preload that is greater than the design vibration environment, simultaneously preventing excessive radial motion and damage arising from resonant vibration.

In another aspect of the present invention, a linear bearing comprises an outer shell, an elastomeric base concentrically disposed within the outer shell, a bearing pad comprising from about 6 to about 20 individual pads, and a helical spring molded integrally within the elastomeric base. The helical spring provides a resilient force through the bearing pad onto a shaft when the shaft is installed in the bearing. The elastomeric base material, interposed between the outer shell and the bearing pad, and a plurality of gaps interposed between each of the individual pads, allows for size and shape variations of the shaft due to manufacturing or differential expansion due to changes in temperature. In yet another aspect of the present invention, a linear bearing comprises an outer shell, an elastomeric bearing pad concentrically disposed within the outer shell, and a helical spring between the outer shell and the bearing pad. The helical spring provides a resilient force through the bearing pad onto a shaft when the shaft is installed inside the bearing. The elastomeric base material, interposed between the outer shell and the bearing pad, in combination with the spring, provide about 4,000 to about 5,000 pounds/inch radial spring rate as measured by deflection of the shaft; The bearing material is selected to provide a maximum linear resistance to axial motion due to friction of about 1 pound with a 20 pound radial load on the bearing. The maximum linear resistance to axial motion is about 5 pounds throughout a temperature range from about minus (−) 65 to about plus (+) 160 degrees F.

In a further aspect of the present invention, a linear bearing for supporting a load along a shaft comprises an outer shell, a bearing pad concentrically disposed within the outer shell, with the bearing pad comprising from about 6 to about 20 individual pads. Each of the individual pads comprising a self-lubricating polymer; a helical spring between the outer shell and the bearing pad. The helical spring provides a resilient force through the bearing pad onto a shaft when the shaft is inserted in the bearing. The elastomeric base material, interposed between the outer shell and the bearing pad, a plurality of gaps interposed between each of the individual pads, allows for size and shape variations of the shaft due to manufacturing or thermal variations. The elastomeric base material and the spring provide from about 4,000 to about 5,000 pounds/inch radial spring rate as measured by deflection of the shaft to keep the shaft centered in a vibration environment. The bearing provides a maximum linear resistance to axial motion of about 1 pound with a 20 pound radial load on the bearing; and the maximum linear resistance to axial motion is about 5 pound throughout a temperature range from about −65 to about 160 degrees F.

In still a further aspect of the present invention, a method for moving a ram air door with a ram door actuator having a nut tube mounted on a linear bearing, comprises a) forming a tubular-shaped outer shell of said linear bearing; b) concentrically disposing a self-lubricating bearing pad within said outer shell; c) installing said linear bearing within a rigid housing; d) providing a resilient force through said bearing pad onto said shaft, said resilient force provided by at least one of a spring and an elastomeric base material; e) providing about 4,000 to about 5,000 pounds/inch radial spring rate as measured by the resiliency of said spring and said elastomeric base material to movement by said shaft; f) providing a maximum linear resistance to axial motion of about 1 pound when said load is about 20 pounds; g) installing said nut tube in said linear bearing; g) moving said nut tube relative to said linear bearing with said ram door actuator, thereby moving said ram air door; and h) cleaning said nut tube with a lip molded onto said outer shell, said lip providing a wiping action on said nut tube during movement of said nut tube within said bearing.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a compliant linear bearing that may be useful in a wide variety of industries where the linear movement along a shaft is performed. For example, the aircraft industry uses linear movement of a shaft within a bearing in a ram door actuator. The linear bearing of the present invention, in a single unit, extends the useful life of the shaft, the bearing housing, and those components that require proper alignment to minimize wear and load concentrations, such as associated gears and bearings.

The present invention can have a self-lubricating bearing pad concentrically disposed within an outer shell. Between the bearing pad and outer shell, elastomeric and thermoplastic compounds and a helically wound wave spring can be disposed to provide a resilient force through the bearing pad when the shaft is installed within the bearing.

In contrast, conventional linear bearings and guides are either expensive, using precision roller or ball bearing supports, or are very inexpensive sleeve type bearings that are oil filled sintered material or split, self-lubricating types to accommodate size variations in the mounting base or the moving output shaft.

Figure 1:
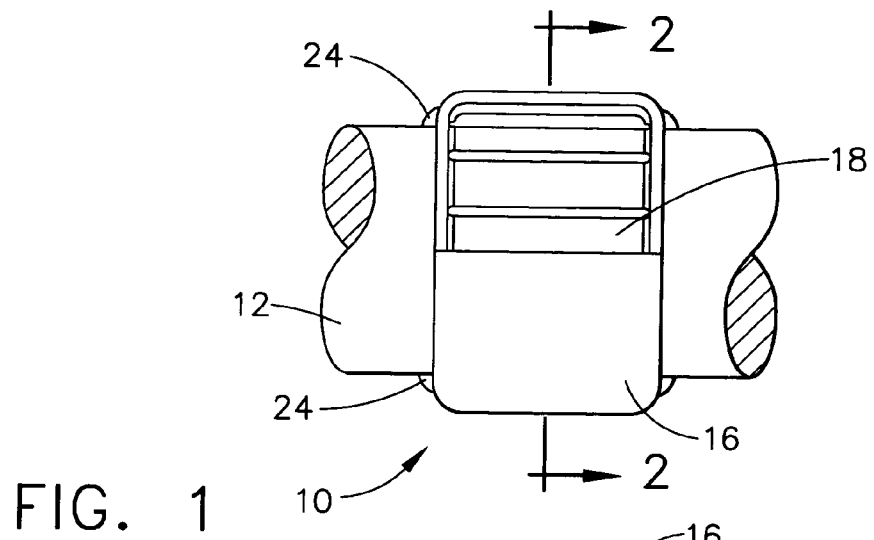
FIG. 1 is a partially cut-away view of the linear bearing of the present invention installed on a tube.

Referring to FIG. 1, there is shown a partially cut-away view of a linear bearing 10 according to the present invention installed on a shaft 12. An outer shell 16 may be cold formed of a material that has a strength sufficient to withstand the physical and mechanical stresses applied during installation within a fixed housing or operation of bearing 10. These stresses may include those caused by vibrations generated during operation of the device in which bearing 10 is a component, such as a ram door actuator of an aircraft. Additionally, these stresses may be caused by a resilient force applied against the interior of outer shell 16, as discussed below. Outer shell 16 may be formed from, for example, a high nickel or corrosion resistant (CRES) alloy steel. Outer shell 16 is preferably tube-shaped, having a thickness to satisfy the strength requirements as discussed above. A bearing pad 18 may be concentrically disposed inside outer shell 16.

Still referring to FIG. 1, a lip 24 may be provided integrally with outer shell 16 to provide a cleaning mechanism for shaft 12. Lip 24 can be located about the entire circumference of outer shell 16. When linear bearing 10 moves along the longitudinal axis of shaft 12, lip 24 may come in contact with shaft 12, providing a wiping action along shaft 12. Lip 24 may be made of any material suitable for the conditions under which the bearing 10 is to be used. Advantageously, lip 24 may be a flexible material, such as chloroprene or fluorocarbon based rubber, sized to provide sufficient pressure on shaft 12 to clean shaft 12 during movement of linear bearing 10, while not adding significantly to the linear resistance to movement of linear bearing 10 along shaft 12.

Figure 2:
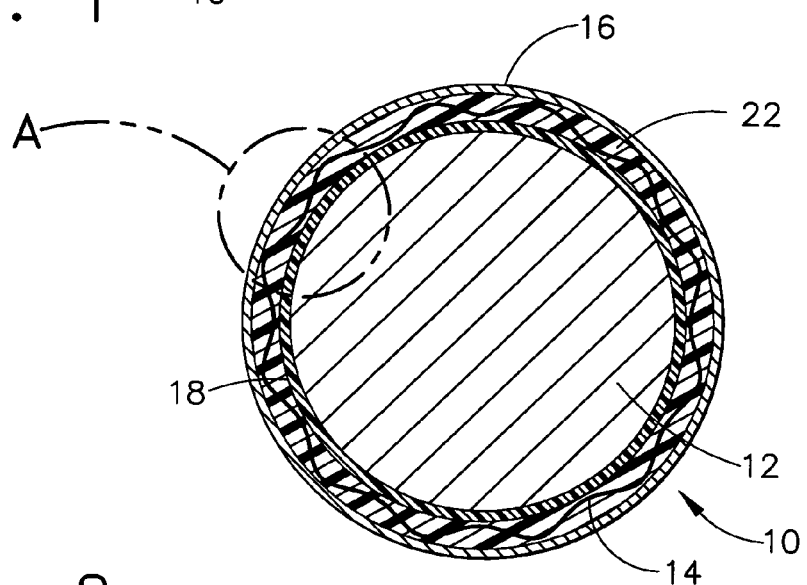
FIG. 2 is a cross-sectional view of the linear bearing of FIG. 1 taken along line 2—2.
Figure 3:
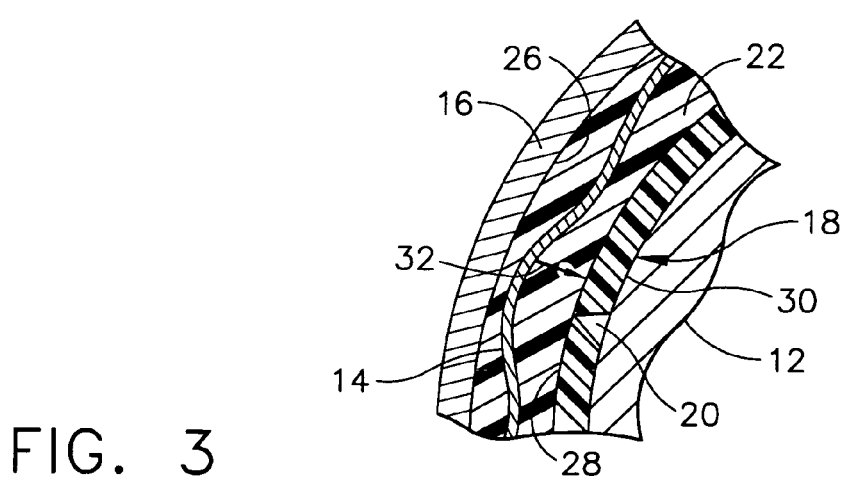
FIG. 3 is a close-up view at circle A of the linear bearing of FIG. 2.

Referring now to FIGS. 2 and 3, there are shown two views (FIG. 2 being a cross-sectional view taken along line 2—2 of FIG. 1, and FIG. 3 being a close-up view of a portion of FIG. 2) of linear bearing 10 according to the present invention. Bearing pads 18 may be concentrically located inside outer shell 16. A spring 14 may fit near an inside edge 26 of outer shell 16, between bearing pads 18 and outer shell 16. Spring 14 may provide a resilient force, as indicated by arrow 32, onto an outside edge 28 of the bearing pads 18 and through to shaft 12 when linear bearing 10 is installed on shaft 10. Bearing pads 18 can provide an inside surface 30 on which linear bearing 10 may move along shaft 12.

Spring 14 may be a wave spring formed to provide a wave-shaped cross-section as shown in FIG. 2. Preferably, spring 14 can be a helically wound wave spring formed from a helically wound resilient material, such as corrosion resistant steel, disposed in an area between outer shell 16 and bearing pads 18 along its axial direction in a wave-shaped configuration as shown in FIG. 2.

An elastomeric base material 22 may be interposed in at least a portion of the area between bearing pads 18 and outer shell 16. Preferably, elastomeric base material 22 entirely fills the area between outer shell 16 and bearing pad 18, thereby integrally molding spring 14 within elastomeric base material 22. Elastomeric base material 22 and spring 14 may be chosen such that the restoring force of spring 14 is greater than the resultant "g" forces caused by operational external vibrations of the device in which linear bearing 10 is installed, thereby keeping shaft 12 centered within linear bearing 10.

Linear bearing 10 may include either spring 14 or elastomeric base material 22. Preferably, linear bearing 10 includes both spring 14 and elastomeric base material 22. Typically, the compounds useful as elastomeric base material 22 and the tension of spring 14 may be chosen to provide about 4,000 to about 5,000 pounds/inch radial spring rate as measured by the resiliency of spring 14 and elastomeric base material 22 to movement by shaft 12 when shaft 12 is installed in linear bearing 10. Elastomeric base material 22 may be chosen from any number of conventional closed-cell elastomeric materials, such as elastomeric foams, including chloroprene containing compounds, and polyurethanes. The appropriate selection of elastomeric base material 22 and the tension of spring 14 may be made based on the desired application. For example, where shaft 12 may vary slightly from a perfect circular shape, a more flexible elastomeric base material 22, and a spring 14 with relatively less tension, may be desirable. This selection of material and spring tension would permit movement of linear bearing 10 along shaft 12, while not radially moving outer shell 16, thereby preventing shaft imperfections from hindering movement of linear bearing 10 along shaft 12.

Bearing pad 18 may be formed of between about 6 to about 20, preferably between about 10 to about 16, and more preferably about 12 individual pads. Bearing pad 18 may be composed of a self-lubricating polymer composite, such as polyetheretherketone (PEEK), polyetherimide, DELRIN® (DuPont, Wilmington, Del.), TORLON® (Solay Advanced Polymers), or TEFLON® (DuPont, Wilmington, Del.). A gap 20 can be provided between each of the individual pads of bearing pad 18. Advantageously, gap 20 is sized small enough to maximize the contact area between inside surface 30 of bearing pad 18 and shaft 12, while being large enough to permit bearing pads 18 to move radially with respect to outer shell 16. This permitted radial movement allows bearing pads 18 to continue providing a radial force, in the direction indicated by arrow 32, on shaft 12 while allowing for shaft size and shape variations. Even more advantageously, gap 20 is triangular-shaped, with the base of triangular-shaped gap 20 formed along inside surface 30 of bearing pad 18 and the apex of triangular-shaped gap 20 formed at outside edge 28 of bearing pad 18, creating space for entrapment of any wear particles.

While the invention has been described above using specific materials for outer shell 16, elastomeric base material 22, and bearing pads 18, any suitable material may be selected based on the desired application of linear bearing 10. The materials should be preferably selected for resistance to organically based fuels and cleaning solvents. Further, the materials should also be selected to provide the desired performance over the intended temperature range. For example, when linear bearing 10 is used in a ram door actuator of an aircraft, this temperature range is typically from about minus (−) 80 to about +200 degrees F., and more typically from about −65 to about +160 degrees F.

EXAMPLE 1

Figure 4:
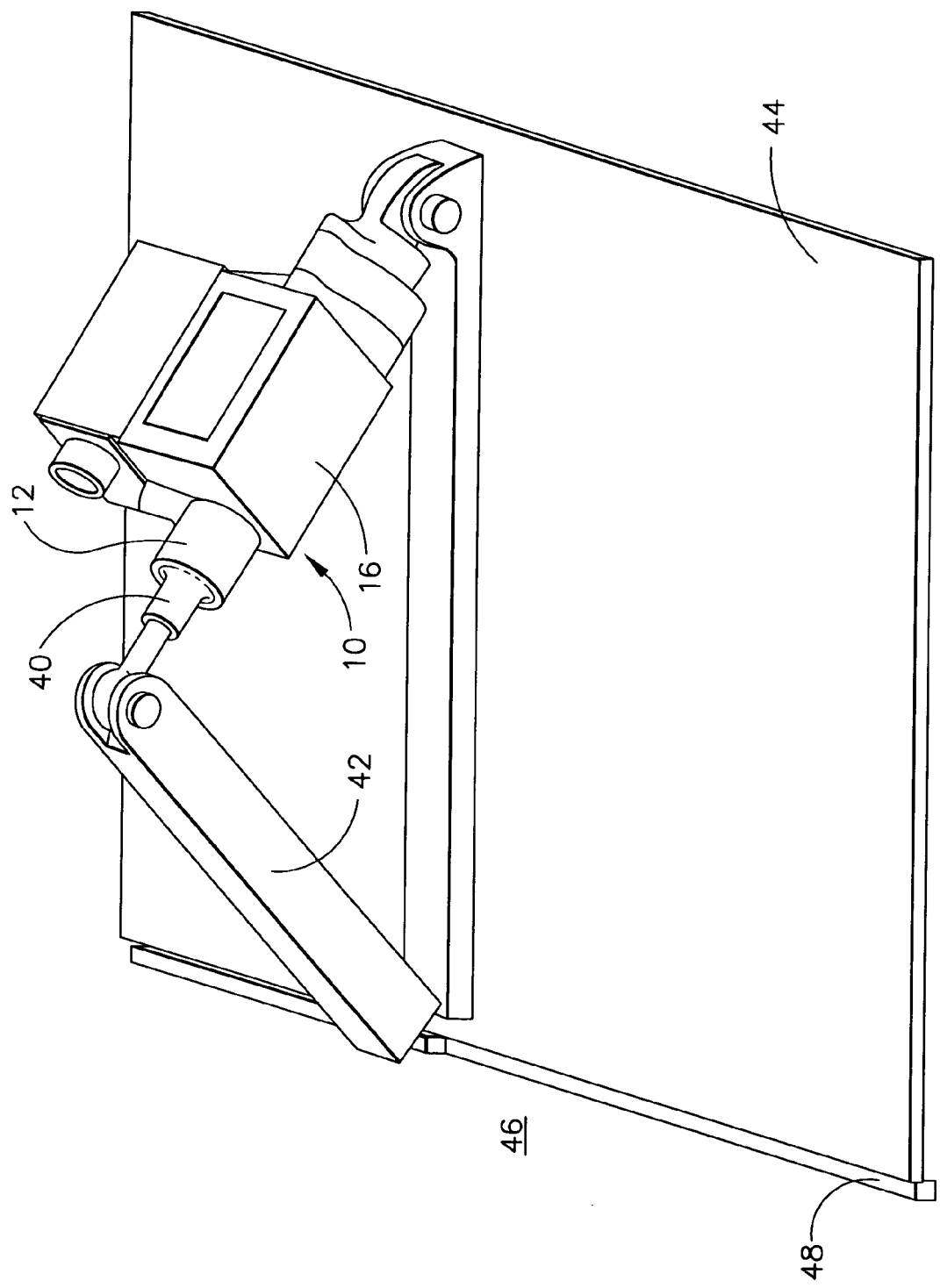
FIG. 4 is a schematic view showing the linear bearing of the present invention used in an aircraft's ram door actuator.

Referring to FIG. 4, a ram door 44 of an aircraft 46 may be attached to a shaft 12. A driven screw 40 (drive means not shown) moves shaft 12 in an axial direction within linear bearing 10. This movement causes ram door 44 to pivot at a hinge 48, allowing the opening and closing of ram door 44. Linear bearing 10 is mounted on a linear bearing support 42. Linear bearing 10 for movement of ram door 44 on aircraft 46 may be made to the following design configuration. The nut tube (shaft 12) for a conventional ram door actuator may be about 0.689±0.001 inch. The outer shell 16 of linear bearing 10 may be made with a length of 0.625±0.001 inch and a outside diameter of 0.878±0.001 inch.

Referring now to FIGS. 2 through 4, spring 14 is molded into elastomeric base material 22 to give 4,000 to 5,000 pounds/inch radial spring rate as measured by deflection of shaft 12. Twelve bearing pads 18 are provided with triangular-shaped gaps 20 therebetween to give a bearing inside diameter of 0.683±0.001 inch, prior to installation of shaft 12. The resulting linear bearing 10 has a maximum linear resistance to axial motion of 1 pound with a 20 pound axial load when operated in temperatures between −65 to 160 degrees F.

It should be understood, of course, that the foregoing relates to preferred embodiments of the invention and that modifications may be made without departing from the spirit and scope of the invention as set forth in the following claims.

I claim:

1. A bearing comprising:
   an outer shell;
   a bearing pad concentrically disposed within said outer shell;
   an elastomeric base material interposed between said outer shell and said bearing pad; and
   a wave spring between said outer shell and said bearing pad, said spring providing a resilient force through said bearing pad onto a shaft when said shaft is installed in said bearing.

2. The bearing according to claim 1, wherein said wave spring is helically wound.

3. The bearing according to claim 1, wherein said bearing pad includes from about 6 to about 20 individual pads.

4. The bearing according to claim 3, wherein said bearing pad includes about 12 individual interlinked pads.

5. The bearing according to claim 4, further comprising a plurality of gaps interposed between each of said individual pads, said gaps allowing for size and shape variations of said shaft.

6. The bearing according to claim 1, wherein said elastomeric base material and said spring provide about 4,000 to about 5,000 pounds/inch radial spring rate as measured by the resiliency of said spring and said elastomeric base material to movement by said shaft.

7. The bearing according to claim 1, wherein said bearing provides a maximum linear resistance to axial motion of about 1 pound with a 20 pound radial load on said bearing.

8. The bearing according to claim 7, wherein said maximum linear resistance to axial motion is about 5 pounds throughout a temperature range from about −65 to about 160 degrees F.

9. The bearing according to claim 1, wherein said bearing pad comprises a self-lubricating, polymer composite.

10. The bearing according to claim 1, further comprising a lip molded onto said outer shell, said lip providing a wiping action on said shaft during movement of said bearing along said shaft, thereby providing a cleaning mechanism.

11. The bearing according to claim 1, wherein said bearing pad comprises a plurality of individual pads, each individual pad of said plurality having an inside surface, an outside surface, and an edge, each individual pad separated from an adjacent individual pad by a triangularly shaped gap extending along the edges of the individual pad and the adjacent individual pad, the triangularly shaped gap extending inwardly from the outer surfaces of the individual pads to the inner surfaces of the individual pads, the outer surfaces of the individual pads connected at an apex of the triangularly shaped gap.

12. A linear bearing comprising:
   an outer shell;
   a bearing pad concentrically disposed within said outer shell;
   a spring between said outer shell and said bearing pad, said spring providing a resilient force through said bearing pad onto a shaft when said shaft is installed in said bearing; and
   an elastomeric base material interposed between said outer shell and said bearing pad.

13. The bearing according to claim 12, wherein said spring is a helically wound wave spring.

14. The bearing according to claim 12, wherein said bearing pad includes from about 6 to about 20 individual pads.

15. The bearing according to claim 14, wherein said bearing pad includes about 12 individual pads.

16. The bearing according to claim 14, further comprising a plurality of gaps interposed between each of said individual pads, said gaps allowing for size and shape variations of said shaft.

17. The bearing according to claim 12, wherein said bearing pad comprises a self-lubricating polymer.

18. The bearing according to claim 12, further comprising a lip molded onto said outer shell, said lip providing a wiping action on said shaft during movement of said bearing along said shaft, thereby providing a cleaning mechanism.

19. A linear bearing comprising:
   an outer shell;
   an elastomeric base material concentrically disposed within said outer shell;
   a self-lubricating bearing pad including from about 6 to about 20 individual pads;
   a helical spring molded integrally within said elastomeric base material, said helical spring providing a resilient force through said bearing pad onto a shaft when said shaft is installed in said bearing; and
   a plurality of gaps interposed between each of said individual pads, said gaps allowing for size and shape variations of said shaft.

20. A linear bearing according to claim 19, wherein said bearing pad includes about 12 individual pads.

21. A linear bearing according to claim 20, wherein:
   said elastomeric base material and said spring provide about 4,000 to about 5,000 pounds/inch radial spring rate as measured by the resiliency of said spring and said elastomeric base material to movement by said shaft;
   said bearing provides a maximum linear resistance to axial motion of about 1 pound with a 20 pound radial load on said bearing; and
   said maximum linear resistance to axial motion is about 5 pounds throughout a temperature range from about −65 to about 160 degrees F.

22. A linear bearing for supporting a load along a shaft, said linear bearing comprising:
   an outer shell;
   a bearing pad concentrically disposed within said outer shell, said bearing pad including from about 6 to about 20 individual pads, each of said individual pads comprising a self-lubricating polymer;
   a wave spring between said outer shell and said bearing pad, said wave spring providing a resilient force through said bearing pad onto a shaft when said shaft is installed in said bearing;
   an elastomeric base material interposed between said outer shell and said bearing pad; and
   a plurality of gaps interposed between each of said individual pads, said gaps allowing for size and shape variations of said; wherein
   said elastomeric base material and said wave spring provide about 4,000 to about 5,000 pounds/inch radial spring rate as measured by the resiliency of said wave spring and said elastomeric base material to movement by said shaft;
   said bearing provides a maximum linear resistance to axial motion of about 1 pound with a 20 pound radial load on said bearing; and
   said maximum linear resistance to axial motion is about 5 pounds throughout a temperature range from about −65 to about 160 degrees F.

23. The linear bearing according to claim 22, wherein said bearing pad comprises about 12 individual pads.

24. A method for moving a load on a shaft through a bearing, comprising:
   forming a tubular-shaped outer shell of a linear bearing;
   concentrically disposing a self-lubricating bearing pad within said outer shell
   installing said linear bearing on said shaft;
   providing a resilient force exerted by a device selected from a group consisting of a helically wound wave spring and a combination of a second spring and an elastomeric base material, through said bearing pad onto said shaft;
   attaching a load to said shaft; and
   moving said linear bearing relative to said shaft, thereby moving said load with said shaft within said linear bearing.

25. The method according to claim 24, wherein the second spring is the helically wound wave spring.

26. The method of claim 25, further comprising:
   providing about 4,000 to about 5,000 pounds/inch radial spring rate as measured by the resiliency of said spring and said elastomeric base material to movement by said shaft.

27. The method according to claim 25, further comprising: providing a maximum linear resistance to axial motion of about 1 pound when said load is about 20 pounds.

28. The method according to claim 25, further comprising cleaning said shaft with a lip molded onto said outer shell, said lip providing a wiping action on said shaft during movement of said bearing along said shaft.

29. A method for moving a ram air door with a ram door actuator having a nut tube mounted on a linear bearing, comprising:
   forming a tubular-shaped outer shell of said linear bearing;
   concentrically disposing a self-lubricating bearing pad within said outer shell;
   installing said linear bearing in a rigid housing;
   providing a resilient force through said bearing pad onto said shaft, said resilient force provided by at least one of a spring and an elastomeric base material;
   providing about 4,000 to about 5,000 pounds/inch radial spring rate as measured by the resiliency of said spring and said elastomeric base material to movement by said shaft;
   providing a maximum linear resistance to axial motion of about 1 pound when said load is about 20 pounds;
   installing said nut tube in said linear bearing; and
   moving said nut tube relative to said linear bearing with said ram door actuator, thereby moving said ram air door; and
   cleaning said nut tube with a lip molded onto said outer shell, said lip providing a wiping action on said nut tube during movement of said nut tube within said bearing.

30. The method according to claim 29, wherein said resilient force is provided with both said spring and said elastomeric base material

* * * * *